United States Patent [19]

Maple

[11] Patent Number: 4,540,914

[45] Date of Patent: Sep. 10, 1985

[54] ABSORBING GRADED NITRIDE FILM FOR HIGH CONTRAST DISPLAY DEVICES

[75] Inventor: T. Grant Maple, Byron, Calif.

[73] Assignee: Lockheed Missiles & Space Company, Inc., Sunnyvale, Calif.

[21] Appl. No.: 450,665

[22] Filed: Dec. 17, 1982

[51] Int. Cl.³ .............................................. H01J 29/20
[52] U.S. Cl. .................................... 313/466; 313/474; 427/64; 427/70
[58] Field of Search .................. 313/466, 474; 427/64, 427/70

[56] References Cited

U.S. PATENT DOCUMENTS

| | | | |
|---|---|---|---|
| 3,108,904 | 10/1963 | Cusano | 117/211 |
| 3,347,603 | 10/1967 | Wendland | 117/33.5 |
| 3,560,784 | 2/1971 | Steele | 313/112 |
| 3,825,436 | 7/1974 | Buchanan et al. | 117/33.5 R |
| 4,132,919 | 1/1979 | Maple | 313/466 |
| 4,275,326 | 6/1981 | Houtkamp | 313/466 |

OTHER PUBLICATIONS

Feldman, Charles "Range of 1-10 Kev Electrons in Solids" Physical Review 1/15/1960, pp. 455-459.

Primary Examiner—David K. Moore
Attorney, Agent, or Firm—Richard H. Bryer

[57] ABSTRACT

A faceplate of a cathode ray tube is shown wherein a cathodoluminescent phosphor material 1 is deposited on glass faceplate 2. A metal nitride metal absorbing inhomogeneous film 3, where the metal is aluminum or silicon, is deposited on the back side of the phosphor material 1. To avoid unwanted reflections at the interface between the glass 2 and the phosphor 1, a homogeneous film 4 is optionally deposited on glass plate 2 prior to deposition of the phosphor film 1. Additionally, an anti-reflection coating 5 may also be optionally applied to the exterior of the glass plate 2 to eliminate reflection that would otherwise occur at the air-glass interface.

15 Claims, 1 Drawing Figure

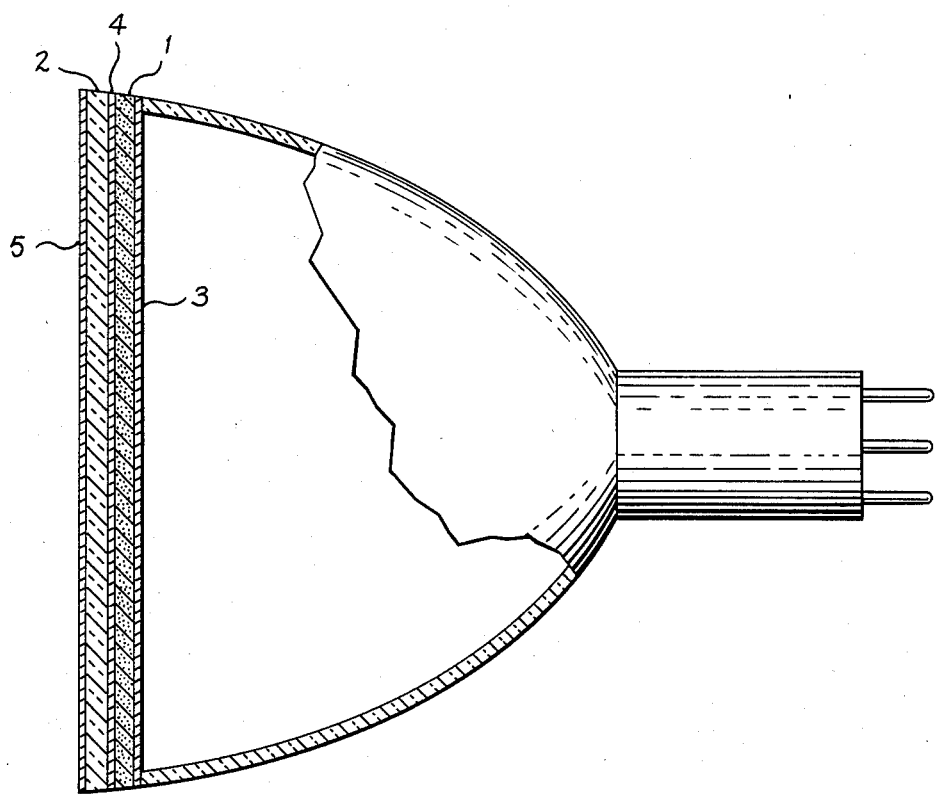

ABSORBING GRADED NITRIDE FILM FOR HIGH CONTRAST DISPLAY DEVICES

TECHNICAL FIELD

This invention relates to light absorbing inhomogeneous films and their use in luminescent display devices to achieve high contrast ratio and minimal halation effect.

BACKGROUND ART

It is well known that ambient illumination, that is light originating from sources external to the display device, is reflected to the observer from various optical interfaces of the device and thus reduces the image contrast by increasing the apparent brightness of the dark image areas. Under conditions of high ambient illumination, the image contrast is severely degraded. In addition, a part of the light emitted by the luminescent material of the device also undergoes undesired reflections, producing a further degradation of contrast and of resolution. When the luminescent material consists of a layer of phosphor material in the form of small powder particles, scattering of the emitted light also occurs, further degrading contrast and resolution.

Various means for overcoming these problems have been proposed. These include the use of various filters including polarizing neutral density and restricted angle or multi-apertured opaque filters. Other methods include the incorporation of a dark material into the glass of the tube face, or a black dye in the phosphor binder of the luminescent layer of the display device. All of the methods have the common disadvantage that the emitted light as well as the reflected ambient light intensity is reduced, with the result that the improvement in contrast ratio is less than desired because the emitted light intensity is a factor upon which the contrast ratio depends.

Recently, U.S. Pat. No. 4,132,919 has disclosed a light absorbing inhomogeneous film having a tapered composition varying continuously from a metal oxide at the phosphor film interface to the metal constituent of the oxide at a point remote from the interface, the film exhibiting a continuous gradient of refractive index from a index approximating the index of the phosphor, at the phosphor-film interface to an index approximating that of the metal. The metal oxide is selected from the group of oxides consisting of tantalum oxide and vanadium oxide. The film is conveniently made by reactive RF sputtering in an argon atmosphere containing an initial small partial pressure of oxygen which is gradually reduced to zero oxygen during the course of the run. The resulting film is capable of absorbing more than ninety-nine percent of initial ambient light and provides excellent contrast even when the display device is viewed in direct sunlight.

It has been found, however, that when a film of U.S. Pat. No. 4,132,919 based on tantalum oxide is utilized in a cathode ray tube device, a considerable portion of the incident electron beam energy is absorbed in penetrating the light absorbing film. The loss of energy of the electron beam appears to result from the large backscattering of electrons associated with the relatively high periodic number of tantalum (73). Thus, in a bilayer CRT phosphor screen having a first phosphor layer of 4000A of europium-activated lanthanum oxysulfide, the red, europium activated layer is well excited whereas the terbium activated layer is insufficiently excited to produce a good green color, when the incident electron beam has an initial energy of 20 Kv. Under the same conditions, a light absorbing layer of the same thickness made of vanadium oxide, permits good excitation of the green phosphor. The periodic number of vanadium (23) is less tantalum, so that the electron beam undergoes less energy loss in penetrating the light absorbing layer. Unfortunately, the pentoxide of vanadium has a melting point of only 690 degrees C., as compared with the 1872 degrees C. melting point of tantalum oxide. Great care must be exercised, therefore, in sealing a faceplate having a vanadium based absorbing film to the glass funnel of the CRT. In this sealing process it is necessary to insure an absence of moisture and oxygen as well as insuring that temperature during sealing does not exceed about 500 degrees C., otherwise serious degradation of the absorbing film will occur.

DISCLOSURE OF INVENTION

Briefly, in accordance with the invention, it has been discovered that an inhomogeneous film of a novel tapered composition varying from metal nitride to metal has superior properties. These novel films are composed of materials of relatively low atomic number, thus alleviating the large energy losses due to backscattering of electrons and the novel films also have a relatively high melting point thus alleviating many problems associated with the sealing of faceplates to funnels for CRT applications.

The metal is selected from the group consisting of aluminum and silicon. The film is readily prepared by a method of deposition which has attractive features of simplicity for preparing inhomogeneous films, requires only a single source of material, and results in highly reproducible light absorbing properties.

More particularly, the films may be prepared by means of RF or DC reactive sputtering wherein the target is aluminum or silicon metal and the sputtering atmosphere consists of a mixture of argon and nitrogen, with the partial pressure of the nitrogen continually varied during deposition of the film in such a manner as to provide the desired inhomogeneity. In one embodiment of the invention, the initial partial pressure of nitrogen is selected such that the initial portion of the deposited film consists of transparent, nonabsorbing aluminum nitride. Once deposition has been initiated, the nitrogen partial pressure is thereafter gradually reduced until it becomes zero. The effect of gradually reducing the nitrogen pressure is to cause the deposited film to become increasingly deficient in nitrogen. At sufficiently low or zero pressure, the material being deposited is metallic, highly absorbing aluminum or silicon. A gradient of refractive index is associated with the gradient of nitrogen deficiency, or excess metal, in the film. The nature of the gradient is dependent on the rate of decrease of nitrogen pressure, equally good results being obtained with either a linear or exponential decrease of pressure as a function of time.

For the purposes of this invention, it is not essential that the composition of the initial deposit be stoichiometric aluminum or silicon nitride, but rather that it be highly transparent and have a refractive index approximately the same as that of the phosphor layer. The nonreflective film will have its maximum effectiveness when the index of refraction of the nonreflective film is equal to the index of the refraction of the luminescent film. In the present invention, the silicon nitride of the nonreflective film has an index of refraction close to that of the La$_2$O$_2$S luminescent film described in U.S. Pat. No. 3,825,436. Consequently, the reflectivity at the phosphor-absorbing film interface is low and the incident light becomes absorbed in the nonreflective film. For a more complete discussion of the reflective properties of multilayer films, see U.S. Pat. No. 4,132,,919.

Owing to the excess metal incorporated into the film, the films of the invention have appreciable electrical conductivity. This property is particularly desirable where the films are to be used in place of the usual aluminum thin film electrode of typical cathode ray screens since the conductivity of the films prevents charge accumulation associated with incidence of the electron beam on the screen which would otherwise distort the information to be presented.

It has been found that aluminum and silicon are uniquely suited as target materials for preparing an inhomogeneous film having the desired properties for use as a nonreflecting layer in light emitting phosphor display devices such as cathode ray tubes. For such devices, it is desirable that the film absorb the incident ambient light, and in addition prevent light originating at the filament of the electron beam gun from reaching the observer. The film must, therefore, be essentially opaque to all visible light.

Control of the nitrogen partial pressure may be conveniently accomplished by means of a micrometer valve placed in the line supplying nitrogen to the sputtering system. Variation of the rate of decrease of nitrogen pressure may, furthermore, be automated by connecting a variable speed electric motor through a gear chain to the micrometer valve and the voltage actuating the motor varied with time. Other means of providing a predetermined automatic variation of the nitrogen partial pressure are known and may be used. By measurements of the nitrogen partial pressure in the system as a function of micrometer setting and measurements of deposition rates at various fixed nitrogen pressures, information required for producing a gradient of composition is readily obtainable. Such automation will insure a very high degree of reproducibility of film properties but is not essential as it has been found that very satisfactory nonreflecting films can be produced by a skilled operator through manual operation of the micrometer valve.

The films of the present invention are to be distinguished from those of U.S. Pat. No. 4,132,919 in that they are based upon nitrides of silicon and aluminum while those of the referenced patent are based upon oxides of vanadium and tantalum. It is to be emphasized that U.S. Pat. No. 4,132,919 remarks that in addition to vanadium and tantalum targets, other target materials that were tried in accordance with the method of that patent were tin, niobium, aluminum, titanium, and molybdenum. The films obtained, with the exception of aluminum were dark when viewed from the oxide side of the film, but were inferior in light absorption to the vanadium and tantalum films, distinct interference colors being noted indicative of appreciable reflection occuring within the films. Studies by applicant subsequent to the disclosure of U.S. Pat. No. 4,132,919, in which silicon was used as a target material in an attempt to prepare absorbing films based on silicon oxide by analogy to the films of U.S. Pat. No. 4,132,919 resulted in films that were either transparent, or, at best, somewhat gray when viewed from the oxide side of the film. The results with a silicon target thus closely resembled those obtained with an aluminum target. It is therefore not obvious that highly absorbing films would be obtained with inhomogeneous films based on silicon nitride or aluminum nitride.

In addition to the unexpected highly absorbing properties of the aluminum-nitride-based and silicon-nitride-based films of the present invention, these films possess the distinct advantage that only a small portion of the energy of the above incident electron beam used to excite the phosphor is required to penetrate the absorbing film in view of the low periodic numbers of aluminum and silicon as compared to vanadium and tantalum. Thus, with a bi-layer phosphor, the second phosphor layer can be more efficiently excited with the nitride films of the present invention compared to the oxide films of U.S. Pat. No. 4,132,919. In addition, the melting points of aluminum nitride and silicon nitride are in excess of 2000 degrees C. and 1900 degrees C., respectively. These materials are considered to be highly refractory and thus the films of the present invention are not subject to the degradation that occurs with vanadium oxide-based films during sealing of cathode ray tube faceplates to the glass funnels.

BRIEF DESCRIPTION OF THE DRAWING

The invention may be more easily understood from the following description and accompanying drawing which is a cross-sectional view of the faceplate of a cathode ray tube constructed in accordance with the invention.

Best Mode of Carrying Out the Invention

Referring more particularly to the drawing, there is shown a cross-section of the faceplate of a cathode ray tube constructed according to the present invention. A cathodoluminescent phosphor material 1 is deposited on the glass faceplate 2. A metal nitride-metal absorbing inhomogeneous film 3, where the metal is aluminum or silicon, is deposited on the back side of the phosphor material 1 by the method of the present invention, described more fully hereinafter. A preferred phosphor material for the luminescent display devices of the invention is described in U.S. Pat. No. 3,825,436. This phosphor has the formula Ln$_2$O$_2$S:RE, where Ln is at least one trivalent rare earth host ion selected from the group consisting of lanthanum, gadolinium, yttrium, and lutetium and RE is at least one trivalent activator ion selected from the group consisting of rare earth ions having atomic numbers 59 through 70 and in which from about 0.001 percent to 20 percent of the trivalent hosts ions have been replaced by at least one said activator ion. However, other continuous crystalline phosphor films deposited by conventional vacuum deposition methods, as described in U.S. Pat. No. 3,347,693, or deposited by the method U.S. Pat. No. 3,108,904 are suitable. Irrespective of the phosphor material employed, it is important that it be deposited as an essentially smooth and continuous transparent film without significant surface texture, thereby avoiding the scattering of light inherent to the use of a powder phosphor layer. Rather than a single phosphor film, the phosphor material 1 may consist of multiple films, each film capable of emitting a different color; see U.S. Pat. No. 3,825,436.

In order to avoid unwanted reflections at the interface between the glass 2 and the phosphor 1 which may arise by reason of a mismatch of the respective refractive indices, a quarter-wave homogeneous film 4 of a suitable material, having refractive index $n_b$ satisfying the Strong relation $n_b = n_a N_c$ where $n_a$ is the refractive index of the glass and $n_c$ is the refractive index of the phosphor, is optionally deposited on the glass plate 2 prior to deposition of the phosphor film 1. The interface reflectivity will thereby be reduced to zero at the given wavelength, but appreciable reflectivity may occur at other wavelengths. A broader minimum with respect to wavelength can be achieved by alternatively depositing a nonabsorbing inhomogeneous film in place of the homogeneous film. Additionally, an anti-reflection coating 5 of conventional type may also be optionally applied to the exterior of the glass plate 2 to eliminate reflection that would otherwise occur at the air-glass interface.

It will be understood that the optional anti-reflection coating 5 and optional homogeneous film 4 or the alternative optional nonabsorbing imhomogeneous film 4 are not essential for obtaining good contrast in most applications for which ambient illumination is moderate, but may be desirable under extremely high ambient illumination intensity, such as that provided in direct sunlight.

As discussed in U.S. Pat. No. 4,132,919, the reflectivity at a boundary between the materials is proportional to the square of the difference in refractive indices of the materials. Small differences are tolerable because negligible reflection results, but large differences produce unavoidably great reflection.

The visibility of an image on a cathode ray tube or other display device is expressed as the contrast ratio $C = (A_r + L_o)/A_r$, where $A_r$ is the intensity of reflected ambient light and $L_o$ is the emitted light viewed by the observer. Obviously, for a high contrast ratio at any given emitted intensity $L_o$, the reflected ambient $A_r$ must be small compared to $L_o$.

The absorbing inhomogeneous films of the invention comprise at the phosphor-film interface a metal nitride having a refractive index closely matching that of the phosphor and at the opposite metal side an index aproximately that of the bulk metal. Illustratively, an absorbing inhomogeneous silicon nitride-silicon film is readily made according to the invention with a refractive index of approximately 2.05 at its interface with the phosphor, thus providing a close match to the refractive index of lanthanum oxysulfide which has been determined to have an index of approximately 2.2, and is therefore particularly suited for use with the inhomogeneous film of this invention and is also one of the brightest of known phosphors. The refractive index at the silicon side of the inhomogeneous film has a refractive index approximating that of bulk silicon which is known to have the complex index 4.086-0.031i.

An absorbing inhomogeneous aluminum nitride-aluminum film is also readily made according to the invention but does not provide as close a match to the refractive index of lanthanum oxysulfide as is obtained with the silicon nitride-silicon film, the refractive index of aluminum nitride, 2.95, differing appreciably from that of lanthanum oxysulfide. The inhomogeneous aluminum nitride - aluminum film of the invention is best suited for use with a phosphor layer having a high index of refraction, such as cadmium sulfide, which has a refractive index in the range 2.5 to 2.7. As it is known that an inverse relationship exists between electron range and the periodic number and density of the components of a film (see Feldman, Phys. Rev. 117, 445, 1960), the aluminum or silicon based films of the invention have particular advantages when it is desired to operate a cathode ray tube or luminescent display device at lower anode voltages.

In another embodiment of this invention, the metal nitride-metal absorbing inhomogeneous film disclosed herein may be advantageously substituted for the special dark dielectric layer of the luminescent panels described in U.S. Pat. No. 3,560,784. The relative simplicity of the method of preparing the films described herein and greater reproducibility of properties of the films prepared by the method of this invention are made evident in Example 1 hereof and the films of this invention may be more economically prepared by reason of the less technically complex equipment required to produce the films than those of U.S. Pat. No. 3,560,784.

It will be readily understood that thin films of inert materials such as silicon oxide may be deposited on the phosphor film prior to deposition of the absorbing inhomogeneous film to serve as a barrier against any possible reaction between the phosphor and the inhomogeneous film that may, for example, be promoted by localized heating due to electron bombardment at high electron beam densities. Where appropriate for matching refractive indices of the adjoining materials, the barrier film may advantageously consist of a mixture, such as silicon oxide and aluminum oxide.

In the examples which follow, a detailed description of the method of preparing the absorbing inhomogeneous films of the invention is provided. A conventional RF sputtering system was used for preparing the films of the examples. Equally satisfactory results may also, however, be obtained by use of DC sputtering. As is well known to those skilled in the art of sputtering, the sputtering atmosphere pressure employed for RF sputtering, typically 1 to 5 microns, differs appreciably from that employed for DC sputtering, typically 50 to 100 microns. It is, therefore, to be expected that somewhat different nitrogen pressures may be required when DC sputtering to attain results equivalent to those of RF sputtering. It is also known that deposition rates may vary between sputtering systems of different manufacture. RF systems which employ added DC bias or crossed electrical and magnetic fields have characteristically high deposition rates. Appropriate allowance must therefore be made for the particular system used. A preliminary calibration of the desired system for deposition rates and film characteristics at various fixed nitrogen partial pressures, at a given input power level, will readily establish the conditions for preparing an inhomogeneous film having the desired refractive index gradient and thickness.

The absorbing inhomogeneous films of the invention may also be prepared by the conventional two-source evaporation method, utilizing a metal nitride as one source and the metal component of the nitride as the second source. The preferred method, by reason of greater convenience and the high reproducibility attainable, is, however, the use of RF sputtering.

EXAMPLE 1

The sputtering system used was a conventional RF system with liquid nitrogen trap and water-cooled substrate support: DC bias or magnetic field were not utilized. The target was a 5-inch diameter aluminum disc and the source to substrate was 5 cm. A shutter was interposed between target and substrate during the pre-sputter clean-up period. The system was initially evacuated by a diffusion pump to a pressure of less than $6 \times 10^{-7}$ Torr, following which the high vacuum valve was partially closed to act as throttle between the sputtering chamber and the diffusion pump. This permitted the diffusion pump to operate within an efficient low pressure range while the higher pressure required for sputtering could be maintained within the sputtering chamber through the continuous admission of the sputtering gases. The sputtering atmosphere consisted of a mixture of argon and nitrogen, with argon being the dominant component. After partially closing the high vacuum valve, a flow of nitrogen was established, the flow being regulated by a micrometer valve to obtain the desired pressure in the sputtering chamber as determined by means of an ionization gauge. The flow of argon was next established and adjusted with a second micrometer valve to provide a total pressure of 5 microns. As the sputtering atmosphere consisted predominantly of argon at all times, no further adjustment of the argon micrometer valve was necessary. The sputtering discharge was then initiated at 400 watts input RF power, and the reflected RF power reduced to a negligible amount by tuning of an impedance matching network. Sputtering was continued for 30 minutes with the shutter in place to prevent deposit on the substrate. This insured removal of undesired possible contaminants absorbed on the target or chamber walls. At the end of this presputtering period, the shutter was opened to allow deposition on the substrate. Deposition was terminated at the desired time by switching off the RF supply.

A preliminary series of depositions using microscope slides as substrate was made at various fixed nitrogen pressures. The films obtained were accordingly homogeneous films. Deposition times were 15 minutes; film thickness were measured by multiple-beam interferometry. The results are summarized in Table I.

TABLE I

| Films Prepared at Fixed Nitrogen Pressures | | | | |
|---|---|---|---|---|
| Sample | Pressure Torr | Thickness A | Deposition Rate A/mm | Appearance |
| 1 | $4.9 \times 10^{-4}$ | 582 | 39 | nearly colorless |
| 2 | $2.9 \times 10^{-4}$ | 2252 | 149 | clear, pale green |
| 3 | $2.2 \times 10^{-4}$ | — | — | dark gray |
| 4 | 0 | 4950 | 350 | metallic |

Target-aluminum

This shows that by changing the nitrogen pressure in the sputtering chamber the deposited film is changed from the clear metal-nitride form to the opaque metal form.

The absorbing inhomogeneous films of the example were prepared in the same manner, except that the nitrogen partial pressure was gradually reduced during the deposition period by adjustment of a micrometer valve according to the schedule of Table II, chosen to produce an approximately exponential rate of pressure decrease and a reasonably linear rate of film thickness increase.

TABLE II

| Inhomogeneous Film Schedule | |
|---|---|
| Time min. | $N_2$ Pressure TORR |
| 0 | $4.6 \times 10^{-4}$ |
| 2 | $3.7 \times 10^{-4}$ |

TABLE II-continued

| Inhomogeneous Film Schedule | |
|---|---|
| Time min. | $N_2$ Pressure TORR |
| 4 | $2.7 \times 10^{-4}$ |
| 6 | $1.8 \times 10^{-4}$ |
| 8 | $1.2 \times 10^{-4}$ |
| 10 | $6.6 \times 10^{-5}$ |
| 12 | $3.0 \times 10^{-5}$ |
| 14 | 0 |
| 16 | End of run |

The reflectivity of several absorbing inhomogeneous aluminum nitride-aluminum films prepared on glass microscope slides according to the method of the example were measured with a Spectra Spot Brightness Meter, Model 1980A-PL, using a diffuse white light source to illuminate the samples. From the known refractive indices of the glass, 1.512, and aluminum nitride, 2.95, the normal incidence reflectivities at air-glass and glass-aluminum nitride interfaces can be calculated using the Fresnel equation as 0.04154 and 0.10386, respectively. The reflectivity R of a glass plate between two semi-infinite media according to Berning (Physics of Thin Films 1, 83, 1963) is given by the equation $$\frac{R}{1-R} = \frac{R_1}{1-R_1} + \frac{R_2}{1-R_2}$$

where $R_1$ and $R_2$ are the reflectivities of the first and second interfaces. Alternatively from a measured reflectivity R and the value of $R_1$, a value of $R_2$ can be determined for an experimental plate. $\Delta R$, the amount by which the experimental $R_2$ exceeds 0.10386 then represents any reflectance occurring within the graded portion of the inhomogeneous film. The advantage of this approach is that, although R is dependent on the refractive indices on each side of the substrate-inhomogeneous film interface, $\Delta R$ is a measure only of reflectance from within the graded (absorbing) part of the inhomogeneous film. Thus, any convenient nonabsorbing substrate material may be used as substrate to evaluate the absorptive properties, and a phosphor film need not have been previously deposited on the substrate. The results are presented in Table III.

TABLE III

| Reflection from Graded Portion of Film | |
|---|---|
| Sample | Reflectivity ($\Delta R$ %) |
| Experimental AlN—Al No. 1 | 3.1 |
| 2 | 0.0 |
| 3 | 0.0 |

Inspection of Sample No. 1 showed traces of a contaminant, probably the result of incomplete cleaning of the glass substrate, to which the excess reflection at this interface can be attributed. It is to be emphasized that the particular schedule of the example was chosen for convenience only and is not essential for preparing light absorbing films for use in cathode ray tubes and luminescent panels. Aluminum nitride-aluminum films with similarly low reflectivities have been prepared according to other partial pressure schedules. It is only essential that the variation of refractive index be reasonably continuous and the films have sufficient thickness to be essentially opaque.

EXAMPLE 2

Films were prepared as in Example 1, but substituting a silicon metal target for the aluminum target. The reflectivity of several absorbing inhomogeneous films prepared according to the method of the example were measured as in Example 1, and the reflectivity of the graded portion of the inhomogeneous film similarly determined. The results are presented in Table IV.

TABLE IV

| Reflection from Graded Portion of Film | |
|---|---|
| Sample | Reflectivity ($\Delta R$ %) |
| Experimental $Si_3N_4$—Si No. 1 | 0.5 |
| 2 | 1.4 |
| 3 | 0.3 |

The films of the example, unlike those of Example 1, were not completely opaque, although black in appearance, when viewed under white light incident on the glass side, some red transmission was observed when the samples were placed between a light source and the observer. It is well known in the semiconductor industry that when silicon wafers are thinned to about 0.001 in. thickness., they become red transmitting, so the red transmission of the inhomogeneous silicon nitride-silicon film is not surprising. Addition of an 800A layer of aluminum renders the inhomogeneous film opaque and may be used where complete opacity is essential. Such films should not be subjected to elevated temperatures because formation of a silicon-aluminum eutectic at 577 degrees C. would degrade the absorption.

I claim:

1. In a viewing screen for a luminescent display device, a transparent viewing portion, a luminescent phosphor layer on the interior surface of said viewing portion and a light absorbing inhomogeneous film covering and adherent to said phosphor layer, said film characterized by having a tapered composition varying continuously from a metal nitride at a point remote from said interface at the phosphor-film interface to the metal constituent of said nitride such that said film exhibits a continuous gradient of refractive index from an index of said phosphor at the phosphor-film interface to an index approximating the index of said metal at said remote point, and said metal nitride being selected from the group of nitrides consisting of aluminum nitride and silicon nitride.

2. A viewing screen in accordance with claim 1 wherein said phosphor has the formula $Ln_2O_2SiRE$, where Ln is at least one trivalent rare earth host ion selected from the group consisting of lanthanum, gadolinium yttrium and lutetium and RE is at least one trivalent activator ion selected from the group consisting of rare earth ions having atomic numbers 59 through 70 and in which from about 0.001 percent to 20 percent of the trivalent host ions have been replaced by at least one said activator ion.

3. A viewing screen in accordance with claim 2 wherein Ln is lanthanum.

4. A viewing screen in accordance with claim 1 wherein said display device is a cathode ray tube.

5. A viewing screen in accordance with claim 1 wherein said phosphor layer consists of multiple phosphor films, each film capable of luminescing at a different color.

6. In a luminescent display device, a transparent viewing portion, a phosphor layer on the interior surface of said viewing portion, a light absorbing inhomogeneous film covering and adherent to said phosphor layer and excitation means for causing said phosphor layer to luminesce, said inhomogeneous film characterized by having a tapered composition varying continuously from a metal nitride at the phosphor-film interface to the metal constituent of said nitride facing said excitation means such that said film exhibits a continuous gradient of refractive index from an index approximating the index of said phosphor at the phosphor-film interface to an index approximating the index of said metal, and said metal nitride being selected from the group of nitrides consisting of aluminum nitride and silicon nitride.

7. A display device in accordance with claim 6 wherein said device is a cathode ray tube.

8. A display device in accordance with claim 6 wherein said phosphor has the formula $Ln_2O_2S:RE$, where Ln is at least one trivalent rare earth host ion selected from the group consisting of lanthanum, gadolinium, yttrium and lutetium and RE is at least one trivalent activator ion selected from the group consisting of rare earth ions having atomic numbers 59 through 70 and in which from about 0.001 percent to 20 percent of the trivalent host ions have been replaced by at least one said activator ion.

9. A display device in accordance with claim 8 wherein Ln is lanthanum.

10. A display device in accordance with claim 6 wherein said phosphor layer consists of multiple phosphor films, each film capable of luminescing at a different color.

11. In a method for making a viewing screen for luminescent display devices, the steps of forming a luminescent phosphor layer on a transparent substrate, and forming a light absorbing inhomogeneus film on said phosphor substrate, said film characterized by having a tapered composition varying continuously from a metal nitride at the phosphor-film interface to the metal constituent of said nitride at a point remote from said interface such that said film exhibits a continuous gradient of refractive index from an index approximating the index of said phosphor at the phosphor-film interface to an index approximating the index of said metal at said remote point and said metal nitride being selected from the group of nitrides consisting of aluminum nitride and silicon nitride.

12. A method in accordance with claim 11 wherein said phosphor has the formula $Ln_2O_2S:RE$, where Ln is at least one trivalent rare earth host ion selected from the group consisting of lanthanum, gadolinium, yttrium and lutetium and RE is at least one trivalent activator ion selected from the group consisting of rare earth ions having atomic numbers 59 through 70 and in which from about 0.001 percent to 20 percent of the trivalent host ions have been replaced by at least one said activator ion.

13. A method in accordance with claim 12 wherein Ln is lanthanum.

14. A method in accordance with claim 11 wherein said display device is a cathode ray tube.

15. A method in accordance with claim 11 wherein said phosphor layer consists of multiple phosphor films, each film capable of luminescing at a different color.

* * * * *